(12) United States Patent
Taunton et al.

(10) Patent No.: US 7,751,557 B2
(45) Date of Patent: *Jul. 6, 2010

(54) DATA DE-SCRAMBLER

(75) Inventors: Mark Taunton, Cambridge (GB); Timothy Martin Dobson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1347 days.

This patent is subject to a terminal disclaimer.

(21) Appl. No.: 10/946,306

(22) Filed: Sep. 22, 2004

(65) Prior Publication Data

US 2005/0084104 A1    Apr. 21, 2005

Related U.S. Application Data

(60) Provisional application No. 60/505,859, filed on Sep. 26, 2003.

(51) Int. Cl.
*H04L 12/56* (2006.01)
(52) U.S. Cl. .................. 380/28; 380/255; 380/257; 370/310.1; 712/22
(58) Field of Classification Search ............ 380/255, 380/257, 28; 712/22; 370/310.1
See application file for complete search history.

(56) References Cited

U.S. PATENT DOCUMENTS

| | | | |
|---|---|---|---|
| 5,369,773 A | 11/1994 | Hammerstrom | |
| 5,612,974 A | 3/1997 | Astrachan | |
| 5,719,890 A | 2/1998 | Thomman et al. | |
| 5,809,493 A | 9/1998 | Ahamed et al. | |
| 5,909,427 A | 6/1999 | Manning et al. | |
| 5,931,954 A | 8/1999 | Hoshina et al. | |
| 5,954,836 A | 9/1999 | Wang | |
| 6,061,449 A | 5/2000 | Candelore et al. | |
| 6,081,921 A | 6/2000 | Simanapalli | |
| 6,182,265 B1 | 1/2001 | Lim et al. | |
| 6,208,655 B1 | 3/2001 | Hodgins et al. | |
| 6,314,102 B1 | 11/2001 | Czerwiec et al. | |
| 6,442,729 B1 | 8/2002 | Kim et al. | |
| 6,448,910 B1 | 9/2002 | Lu | |
| 6,570,927 B1 | 5/2003 | Van Stralen et al. | |
| 6,577,678 B2 | 6/2003 | Scheuermann | |
| 6,594,262 B1 | 7/2003 | Kwon et al. | |
| 6,631,488 B1 | 10/2003 | Stambaugh et al. | |
| 6,697,994 B2 | 2/2004 | Ishikawa | |
| 6,754,283 B1 | 6/2004 | Li | |

(Continued)

OTHER PUBLICATIONS

Splitterless asymmetric digital subscriber line transceivers 2 (splitterless ADSL2), International Telecommunications Union (ITU-T Recommendation G.992.4), 24 pages, Jul. 2002.

(Continued)

*Primary Examiner*—Kimyen Vu
*Assistant Examiner*—Edward Zee
(74) *Attorney, Agent, or Firm*—Sterne, Kessler, Goldstein & Fox PLLC (57) ABSTRACT

A method and apparatus are disclosed for efficiently de-scrambling one or more bytes of data according to DSL standards on a processor. This is achieved by providing an instruction for de-scrambling one or more bytes of data according to the DSL standards. Accordingly, the invention advantageously provides a processor with the ability to de-scramble data with a single instruction thus allowing for more efficient and faster de-scrambling operations for subsequent processing.

28 Claims, 4 Drawing Sheets

| DSLDSC | OUT | STATE | IN |
|---|---|---|---|

U.S. PATENT DOCUMENTS

| | | | |
|---|---|---|---|
| 6,915,427 | B2 | 7/2005 | Maruyama et al. |
| 7,039,852 | B2 | 5/2006 | Dent |
| 7,055,088 | B2 | 5/2006 | Betts |
| 7,139,305 | B2 | 11/2006 | Gavnoudias et al. |
| 7,154,895 | B1 | 12/2006 | Bornemisza et al. |
| 7,199,740 | B1 | 4/2007 | Ferguson et al. |
| 7,305,567 | B1 * | 12/2007 | Hussain et al. .............. 713/189 |
| 7,305,608 | B2 | 12/2007 | Taunton et al. |
| 7,580,412 | B2 | 8/2009 | Taunton et al. |
| 2001/0008001 | A1 | 7/2001 | Suemura |
| 2002/0124154 | A1 | 9/2002 | Stacey et al. |
| 2002/0138721 | A1 | 9/2002 | Kwon et al. |
| 2003/0016670 | A1 | 1/2003 | Seidl et al. |
| 2003/0091109 | A1 | 5/2003 | Okunev et al. |
| 2003/0190910 | A1 | 10/2003 | Scheuermann |
| 2003/0225949 | A1 * | 12/2003 | Hoang et al. .................. 710/22 |
| 2004/0025104 | A1 | 2/2004 | Amer |
| 2005/0068957 | A1 | 3/2005 | Taunton et al. |
| 2005/0068958 | A1 | 3/2005 | Taunton et al. |
| 2005/0068959 | A1 | 3/2005 | Taunton et al. |
| 2005/0069134 | A1 | 3/2005 | Taunton et al. |
| 2005/0094551 | A1 | 5/2005 | Taunton et al. |
| 2005/0100111 | A1 | 5/2005 | Taunton et al. |
| 2005/0240936 | A1 | 10/2005 | Jones et al. |
| 2006/0050739 | A1 | 3/2006 | Narad et al. |
| 2008/0137771 | A1 | 6/2008 | Taunton et al. |

OTHER PUBLICATIONS

Asymmetric digital subscriber line (ADSL) transceivers, International Telecommunications Union (ITU-T Recommendation G.992.1), 256 pages, Jun. 1999.

Splitterless asymmetric digital subscriber line (ADSL) transceivers, International Telecommunication Union (ITU-T Recommendation G.992.2), 179 pages, Jun. 1999.

Asymmetric digital subscriber line transceivers 2 (ADSL2), International Telecommunication Union (ITU-T Recommendation G.992.3), 436 pages, Jan. 2005.

International Telecommunications Union, "Integrated Services Digital Network (ISDN) ISDN User Network Interfaces", ITU-T Recommendation I.432, Mar. 1993, all pages.

Wen-Yu Tseng et al., "Design and Implementation of a High Speed Parallel Architecture for ATM UNI," ISPAN, pp. 288-294, 1996 International Symposium on Parallel Architectures, Algorithms and Networks (ISPAN '96), 1996.

Seo et al., "Bit-level packet-switching all-optical multihop shuffle networks with deflection routing", Applied Optics, vol. 36, No. 14, May 10, 1997, pp. 3142-3146.

Wilson, "FirePath" Tuesday, Aug. 20, 2002.

Clarke, "Broadcom's Firepath combines RISC, DSP elements", EE Times (Jun. 13, 2001 3:27 PM EDT).

Jae Sung Lee, "Design of new DSP instructions and their hardware architecture for highspeed FFT", 2001 IEEE Workshop on Signal Processing Systems, IEEE Workshop on Sep. 26-28, 2001 pp.: 80-90.

Seong-Jo Na, "Design and implementation for 125 mW/Mips ultra-high speed low power asymmetric digital subscriber line transceiver chip", The First IEEE Asia Pacific Conference on ASICs, 1999, AP-ASIC '99, Aug. 23-25, 1999 pp.: 21-24.

Non-Final Rejection mailed Feb. 5, 2008 for U.S. Appl. No. 10/946,304, 20 pgs.

Final Rejection mailed Oct. 20, 2008 for U.S. Appl. No. 10/946,304, 22 pgs.

Notice of Allowance mailed Apr. 15, 2009 for U.S. Appl. No. 10/946,304, 4 pgs.

Non-Final Rejection mailed May 12, 2008 for U.S. Appl. No. 10/946,305, 13 pgs.

Final Rejection mailed Oct. 29, 2008 for U.S. Appl. No. 10/946,305, 12 pgs.

Non-Final Rejection mailed May 12, 2008 for U.S. Appl. No. 10/946,303, 13 pgs.

Final Rejection mailed Nov. 14, 2008 for U.S. Appl. No. 10/946,303, 12 pgs.

Notice of Allowance mailed Jan. 25, 2010 for U.S. Appl. No. 10/946,303, 10 pgs.

Non-Final Rejection mailed Jan. 16, 2008 for U.S. Appl. No. 10/946,173, 12 pgs.

Second Non-Final Rejection mailed Oct. 28, 2008 for U.S. Appl. No. 10/946,173, 14 pgs.

Final Rejection mailed May 12, 2009 for U.S. Appl. No. 10/946,173, 14 pgs.

Third Non-Final Rejection mailed Nov. 24, 2009 for U.S. Appl. No. 10/946,173, 15 pgs.

* cited by examiner

| OPCODE | DESTINATION | SOURCE 1 | SOURCE 2 |

FIG. 3B

| DSLDSC | OUT | STATE | IN |

FIG. 4

DATA DE-SCRAMBLER

CROSS-REFERENCE TO RELATED APPLICATIONS

This application claims priority from U.S. provisional application No. 60/505,859 filed on Sep. 26, 2003 and titled "System and Method for Descrambling Digital Subscriber Line Data" which is incorporated by reference herein in its entirety. This application is also related to U.S. patent application Ser. No. 60/505,846 filed on Sep. 26, 2003 and titled "System and Method for Scrambling Digital Subscriber Line Data".

BACKGROUND OF THE INVENTION

1. Field of the Invention

The present invention relates generally to Digital Subscriber Line (DSL) systems and to the design of instructions for processors. More specifically, the present invention relates to a system, method and processor instruction for de-scrambling data in a DSL modem.

2. Related Art

In modems for Digital Subscriber Line (DSL) systems based on Discrete Multi-Tone (DMT) modulation, it is common to apply a data scrambling technique as part of the transmission process. For example, international and national standards for both Asymmetric Digital Subscriber Line (ADSL) and DMT-based Very High Bit-Rate DSL (VDSL) require scramblers. The stream of data bits created within the transmitter part of a DSL modem is defined by these standards to be scrambled using a specified scrambling process.

The intent of the scrambling process is to deliberately create a seemingly random pattern of bits in the scrambled output stream, even if a regular pattern of values (for example, all 0 bits, all 1 bits, or regularly alternating 0s and 1s, etc. . . . ) is received in the original input to the scrambler. This is important to avoid potential problems the presence of such patterns can cause in the subsequent generation and handling of analog signals modulated by the bit stream.

The scrambling process is, by necessity, well-defined and reversible. In a receiving modem, after the seemingly random bit sequence has been demodulated from the received analog signal, it is passed through a complementary de-scrambler which performs the inverse process and recovers the original bit stream which was fed to the scrambler in the transmitter.

In existing standards for both ADSL and VDSL, a single specification is used for the scrambling process. The effect of this scrambler specification is to create an output stream of bits $y(n)$ ($n=0, 1, 2, \ldots$) from an input stream of bits $x(n)$, in the following manner:

$$y(n)=x(n)+y(n-18)+y(n-23)$$

where + means addition modulo 2 (which is the equivalent to logical "exclusive-or"). Thus, the sequence of scrambled output bits depends on both the values of the unscrambled input bits $x(n)$ and the values of previously generated (scrambled) output bits $y(n)$.

Although the relevant DSL standards do not define the behaviour of a receiving modem, it is required in any practical receiver that the de-scrambler implements the inverse processing to create a de-scrambled sequence $z(n)$, where $n=(0, 1, 2, \ldots )$, by any means equivalent to:

$$z(n)=y(n)+y(n-18)+y(n-23)$$

where again + means addition modulo 2. If no corruption of the $y(n)$ sequence has occurred between scrambler and de-scrambler, $z(n)$ will equal $x(n)$ for all $n>23$. For $n<23$, the values of both $y(n)$ and $z(n)$ depend respectively on the initial values of scrambler and de-scrambler versions of the sequence $y(m)$ ($m=-23, -22, \ldots -1$), which is not defined. If $y(m)$ at the receiver=$y(m)$ at the transmitter then $z(n)$ will equal $x(n)$ for all $n>0$, but this matching is neither required nor guaranteed by the standards. The fact that the first 23 bits of the de-scrambled bit stream are not reliable is usually considered an unimportant issue in practice.

In prior art hardware oriented DSL modems, the de-scrambling of data is typically performed by fixed-function logic circuits. However, such system designs are typically much less adaptable to varying application requirements. In such hardware implementations of the de-scrambling function, the data flow is fixed in an arrangement dictated by the physical movement of data through the hardware, and cannot be adapted or modified to suit different modes of use. For example, in such systems, the 'state' (the history of earlier input bits) is held internally within the de-scrambling hardware, rather than being passed in as and when de-scrambling is required. This means that re-using a hardware implementation to de-scramble multiple distinct data streams at the same time is either impossible, or certainly more complex to implement, since some arrangement must be made to allow the individual states for the different streams to be swapped in and out.

Current prior art DSL modems often use software to perform at least some of the various functions in a modem. One disadvantage of de-scramblers in current DSL modems is the inefficiency of such de-scramblers as the line-density and data-rates required of modems increase. As line-density and data-rates increase, so does the pressure on prior art de-scramblers to perform efficiently the individual processing tasks, such as de-scrambling, which make up the overall modem function.

Another disadvantage with current prior art de-scramblers is the software complexity required to implement such de-scramblers. Using conventional bit-wise instructions such as bit-wise shift, bit-wise excusive-or, etc. . . . may take many tens or even hundreds of cycles to perform the de-scrambling operation for a typical data block of 100 bytes.

Thus, the de-scrambling process can represent a significant proportion of the total computational cost for current prior art DSL modems, especially in the case of a multi-line system where one processor handles the operations for multiple lines. With increasing workloads, it becomes necessary to improve the efficiency of the de-scrambling of data over that of such prior art modems.

Further limitations and disadvantages of conventional and traditional approaches will become apparent to one of skill in the art, through comparison of such systems with the present invention as set forth in the remainder of the present application with reference to the drawings.

SUMMARY OF THE INVENTION

According to the present invention, these objects are achieved by a system and method as defined in the claims. The dependent claims define advantageous and preferred embodiments of the present invention.

The present invention provides a method and apparatus for efficiently de-scrambling one or more bytes of data according to DSL standards in a modem processor. This is achieved by providing an instruction for de-scrambling one or more bytes of data according to the DSL standards in a modem processor.

The system and method of the present invention advantageously provide a processor with the ability to de-scramble data with a single instruction thus allowing for more efficient and faster de-scrambling operations for subsequent processing. For example, in one embodiment, the present invention advantageously implements the de-scrambling process for eight bytes of data in a single operation. In this embodiment, the instruction takes as input 64 bits of scrambled source data, and 23 bits of previous de-scrambling state, and produces as output 64 bits of de-scrambled data. Thus, the present invention significantly reduces the number of cycles needed to perform the de-scrambling of data which has been scrambled in accordance with DSL standards. The present invention also advantageously provides great flexibility in determining the arrangement and flow of data during the de-scrambling process through the use of registers and memory for storing the scrambled source data, the resulting de-scrambled data, and the previous de-scrambling state.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

The invention generally pertains to a new instruction for operating a processor which significantly reduces the number of cycles needed to perform the de-scrambling of data in accordance with DSL standards (e.g. ADSL or VDSL). In one embodiment, the present invention directly implements the de-scrambling process for 8 bytes (64 bits) of data in a single operation. The instruction takes as input 64 bits of scrambled source data, and 23 bits of previous de-scrambling state, and produces as output 64 bits of de-scrambled data. Because of the definition of the de-scrambling process, the last 23 bits of the scrambled input data from one application of the instruction for a data stream act as the "previous de-scrambling state" input to the next application of the instruction to the same stream.

Embodiments of the invention are discussed below with references to FIGS. 1 to 4. However, those skilled in the art will readily appreciate that the detailed description given herein with respect to these figures is for explanatory purposes as the invention extends beyond these limited embodiments.

Figure 1:
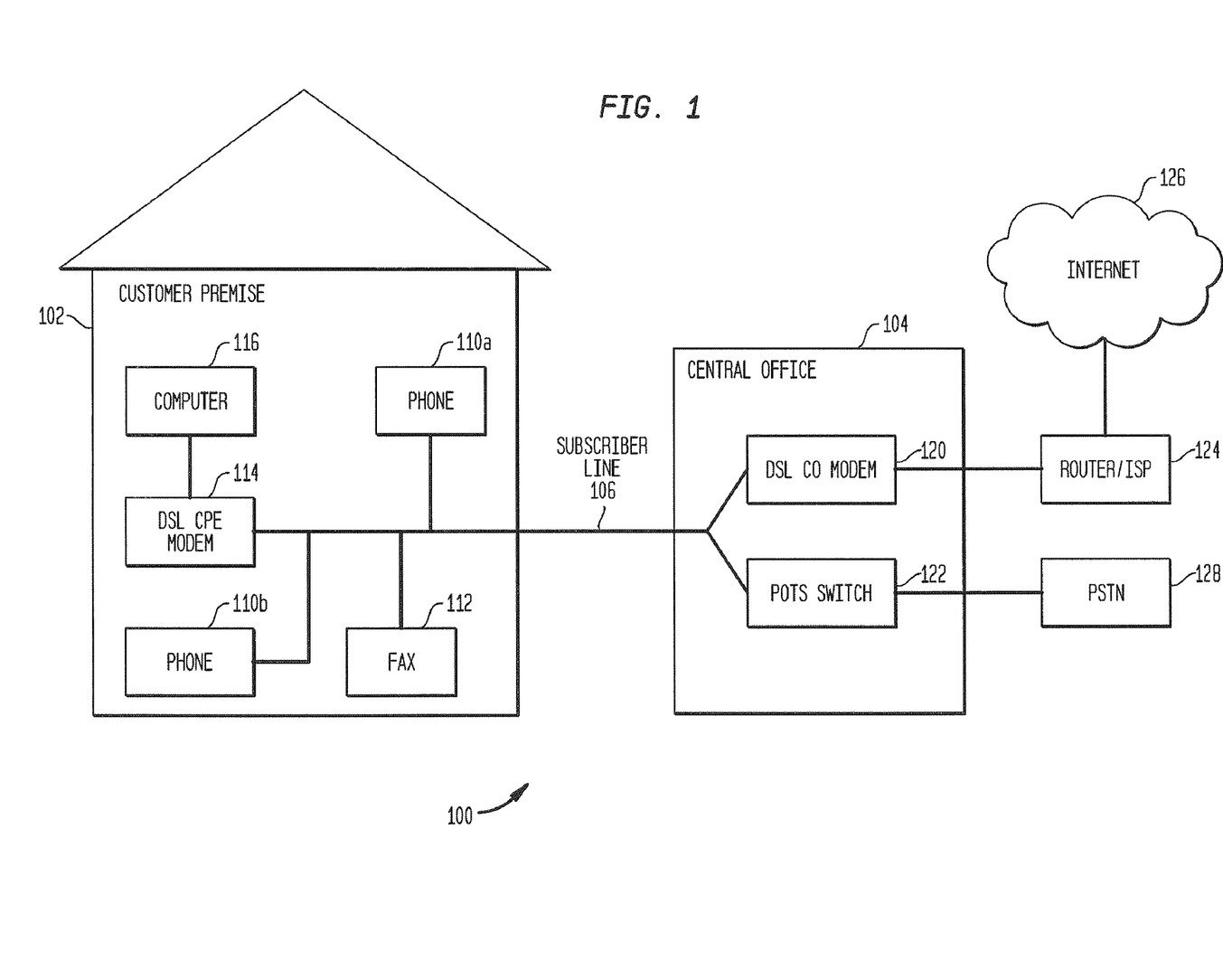
FIG. 1 illustrates a block diagram of a communications system in accordance with the present invention.

Referring now to FIG. 1, there is shown a block diagram of a communications system 100 in accordance with one embodiment of the present invention. System 100 provides traditional voice telephone service (plain old telephone service—POTS) along with high speed Internet access between a customer premise 102 and a central office 104 via a subscriber line 106. At the customer premise end 102, various customer premise devices may be coupled to the subscriber line 106, such as telephones 110a, 100b, a fax machine 112, a DSL CPE (Customer Premise Equipment) modem 114 and the like. A personal computer 116 may be connected via DSL CPE modem 114. At the central office end 104, various central office equipment may be coupled to the subscriber line 106, such as a DSL CO (Central Office) modem 120 and a POTS switch 122. Modem 120 may be further coupled to a router or ISP 124 which allows access to the Internet 126. POTS switch 122 may be further coupled to a PSTN 128.

In accordance with one embodiment of the present invention, system 100 uses a Discrete Multi-Tone (DMT) modulation technique to send and receive data between the central office 104 and the customer premise 102 via subscriber line 106. The DSL CO modem 120 at the central office 104 scrambles the data to be transmitted and transmits the scrambled data to DSL CPE modem 114 via subscriber line 106. Upon receiving the scrambled data, DSL CPE modem 114 de-scrambles the received scrambled data in accordance with the principles of the present invention. Similarly, when data is sent from the customer premise 102 to the central office 104, the DSL CPE modem 114 at the customer premise 102 scrambles the data to be transmitted and transmits the scrambled data to DSL CO modem 120 via subscriber line 106. DSL CO modem 120 de-scrambles the received scrambled data in accordance with the principles of the present invention. In a preferred embodiment, DSL CO modem 120 incorporates a BCM6411 or BCM6510 device, produced by Broadcom Corporation of Irvine, Calif., to implement its various functions.

Figure 2:
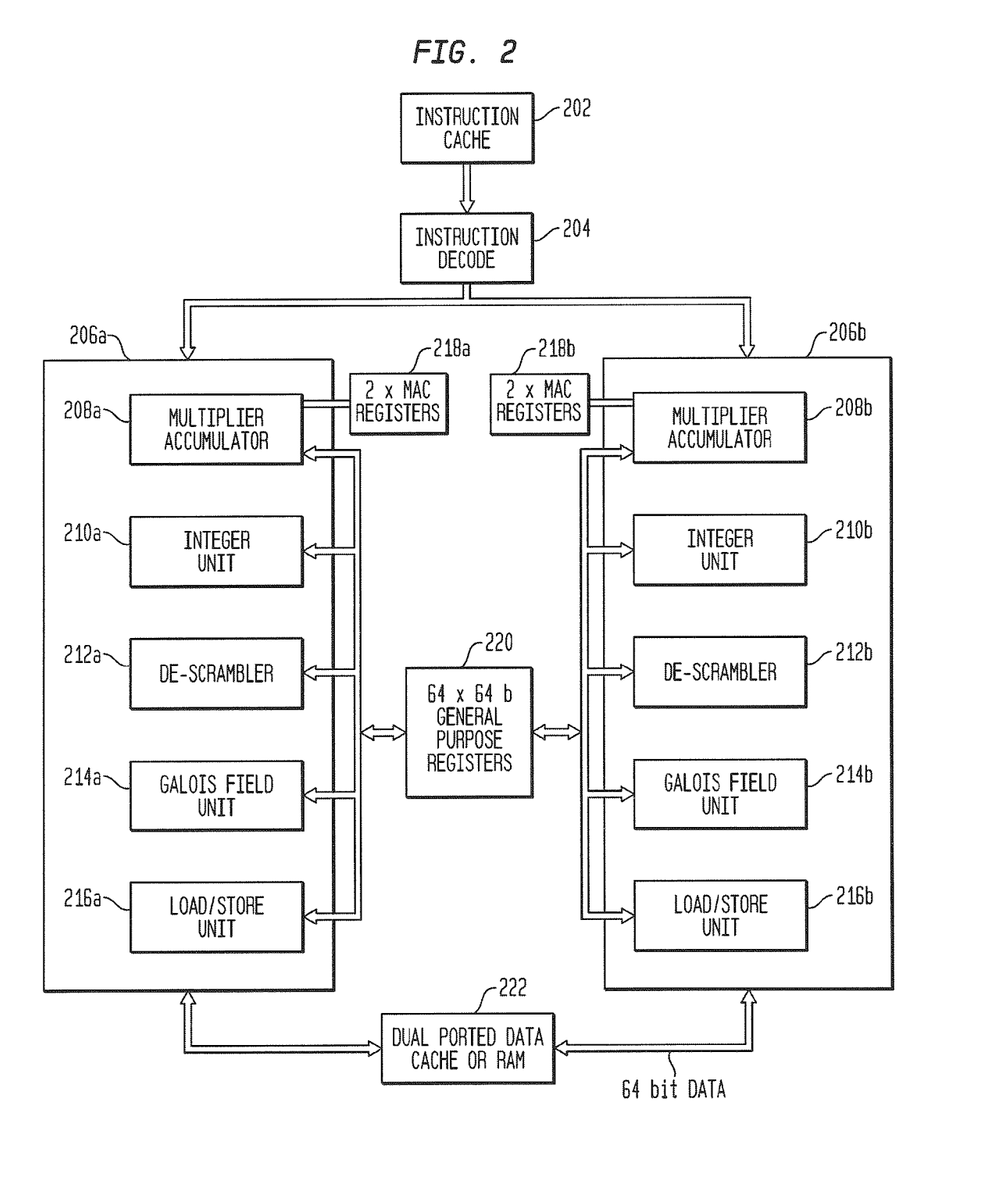
FIG. 2 illustrates a block diagram of a processor in accordance with one embodiment of the present invention.

Referring now to FIG. 2, there is shown a schematic block diagram of the core of a modem processor 200 in accordance with one embodiment of the present invention. In a preferred embodiment, processor 200 is the FirePath processor used in the BCM6411 and BCM6510 devices. The processor 200 is a 64 bit long instruction word (LIW) machine consisting of two identical execution units 206a, 206b. Each unit 206a, 206b is capable of 64 bit execution on multiple data units, (for example, four 16 bit data units at once), each controlled by half of the 64 bit instruction. The twin execution units, 206a, 206b, may include single instruction, multiple data (SIMD) units.

Processor 200 also includes an instruction cache 202 to hold instructions for rapid access, and an instruction decoder 204 for decoding the instruction received from the instruction cache 202. Processor 200 further includes a set of MAC Registers 218a, 218b, that are used to improve the efficiency of multiply-and-accumulate (MAC) operations common in digital signal processing, sixty four (or more) general purpose registers 220 which are preferably 64 bits wide and shared by execution units 206a, 206b, and a dual ported data cache or RAM 222 that holds data needed in the processing performed by the processor. Execution units 206a, 206b further comprise multiplier accumulator units 208a, 208b, integer units 210a, 210b, de-scrambler units 212a, 212b, Galois Field units 214a, 214b, and load/store units 216a, 216b.

Multiplier accumulator units 208a, 208b perform the process of multiplication and addition of products (MAC) commonly used in many digital signal processing algorithms such as may be used in a DSL modem.

Integer units 210a, 210b, perform many common operations on integer values used in general computation and signal processing.

Galois Field units 214a, 214b perform special operations using Galois field arithmetic, such as may be executed in the implementation of the well-known Reed-Solomon error protection coding scheme.

Load/store units 216a, 216b perform accesses to the data cache or RAM, either to load data values from it into general purpose registers 220 or store values to it from general purpose registers 220. They also provide access to data for transfer to and from peripheral interfaces outside the core of processor 200.

De-scrambler units 212a, 212b directly implement the de-scrambling process for the processor 200. These units may be instantiated separately within the processor 200 or may be integrated within another unit such as the integer unit 210. In one embodiment, each de-scrambler unit 212a, 212b takes as input 64 bits of scrambled source data, and 23 bits of previous de-scrambling state, and produces as output 64 bits of de-scrambled data. While as described above the scrambling process is recursive in nature (later output bits depend on earlier output bits), the de-scrambling process is not: later output bits depend only on earlier input bits, not earlier output bits. The last 23 bits of the scrambled input data from one application of this instruction for some data stream act as the "previous de-scrambling state" input to the next application of the de-scrambling function to the same data stream.

Figure 3A:
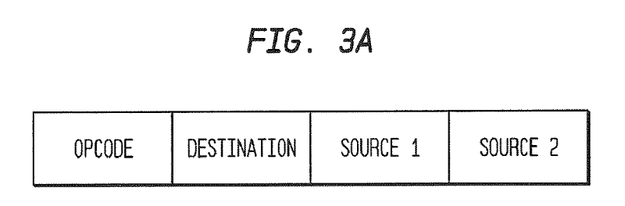
FIG. 3A illustrates an instruction format for a three-operand instruction supported by the processor in accordance with one embodiment of the present invention.

Referring now to FIG. 3A, there is shown an example of an instruction format for a three-operand instruction supported by the processor 200. In one embodiment, the instruction format includes 14 bits of opcode and control information, and three six-bit operand specifiers. As will be appreciated by one skilled in the art, exact details such as the size of the instruction in bits, and how the various parts of the instruction are laid out and ordered within the instruction format, are not themselves critical to the principles of present invention: the parts could be in any order as might be convenient for the implementation of the instruction decoder 204 of the processor 200 (including the possibility that any part of the instruction such as the opcode and control information may not be in a single continuous sequence of bits such as is shown in FIG. 3). The operand specifiers are references to registers in the set of general purpose registers 220 of processor 200. The first of the operands is a reference to a destination register for storing the results of the instruction. The second operand is a reference to a first source register for the instruction, and the third operand is a reference to a second source register for the instruction.

Figure 3B:
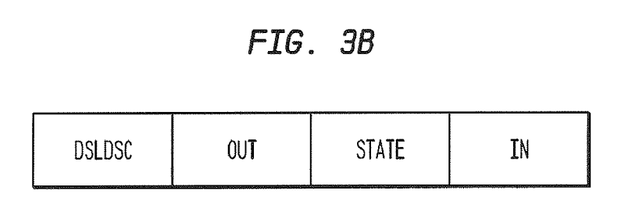
FIG. 3B illustrates an instruction format for de-scrambling one or more bytes in accordance with one embodiment of the present invention.

Referring now to FIG. 3B, there is shown an example of a possible instruction format for de-scrambling one or more bytes of data (DSLDSC) supported by processor 200 in accordance to the present invention. (Again it should be observed that exact details of how this instruction format is implemented—the size, order and layout of the various parts of the instruction, exact codes used to represent the DSLDSC opcode, etc.—are not critical to the principles of the present invention.) The DSLDSC instruction uses the three-operand instruction format shown in FIG. 3A, and in one embodiment, is defined to take three six-bit operand specifiers. The first of the operands is a reference to a destination register for an output "out" where the results of the DSLDSC instruction are stored. The second operand is a reference to a source register for a state input "state" from which state data is read, and the third operand is a reference to a source register for the data input "in" from which the scrambled source data is read. One skilled in the art will realize that the present invention is not limited to any specific register or location for those registers but that the instruction of the present invention may refer to an arbitrary register in the general purpose registers 220.

Thus, by means of this generality of specification, the present invention advantageously achieves great flexibility in the use of the invention. For example, the present invention enables the scrambled source data, which is to be de-scrambled, to be obtained from any location chosen by the implementer (e.g. by first loading that data from the memory 222 into any convenient register). Likewise, the resulting de-scrambled data may be placed anywhere convenient for further processing such as in some general purpose register 220 for immediate further operations, or the resulting de-scrambled data may then be stored back in memory 222 for later use. Similarly, the arrangement of how the 'state' data is obtained is also completely unconstrained, but may be arranged according to preference as to how the scrambled and unscrambled data streams are handled. Thus, the flexibility of the present invention is in sharp contrast to conventional (hardware) implementations of the de-scrambling function, where the data flow is fixed in an arrangement dictated by the physical movement of data through the hardware, and cannot be adapted or modified to suit different modes of use. For example, typically in such hardware contexts the 'state' (the history of earlier input bits) is held internally within the de-scrambling hardware, rather than being passed in as and when de-scrambling is required. This means that re-using a hardware implementation to de-scramble multiple distinct data streams at the same time is either impossible, or certainly more complex to implement, since some arrangement must be made to allow the individual states for the different streams to be swapped in and out.

In one embodiment, the de-scrambling instruction is used in the software on a processor chip-set implementing a central-office modem end of a DSL link (e.g. ADSL or VDSL). However, one skilled in the art will realize that the present invention is not limited to this implementation, but may be equally used in other contexts where data must be de-scrambled in the same way, such as in a DSL CPE modem at the customer premise, or in systems not implementing DSL.

In one embodiment, the DSLDSC instruction takes as one input an 8-byte sequence of scrambled data bytes as a composite 64-bit value. Its second input is a 23-bit value holding the state of the de-scrambling process between consecutive sections of data being de-scrambled, along with 41 bits which are ignored. In a preferred embodiment, this 23-bit state is equal to the last 23 bits of the previous input of the de-scrambling process (i.e. the scrambled data bits processed in a previous execution of the instruction for the same data stream). In operation of the instruction, the input data bytes are de-scrambled using the defined de-scrambling method acting upon each consecutive bit in the data input operand. This combines the 64 bits of data with the 23 bits of previous state, to yield 64 bits of result; the 64 result bits are then written to the output operand. The last 23 bits of the data input (the scrambled data bytes) are also usable as the state input for the next de-scrambling operation to be applied to the same data stream (i.e. de-scrambling of the following 64 bits of data).

More specific details of one embodiment of the operation performed by the DSLDSC instruction are described below:

$$out.\langle 17\ldots 0\rangle = data.\langle 17\ldots 0\rangle \wedge state.\langle 63\ldots 46\rangle \wedge state.\langle 58\ldots 41\rangle$$

$$out.\langle 22\ldots 18\rangle = data.\langle 22\ldots 18\rangle \wedge data.\langle 4\ldots 0\rangle \wedge state.\langle 63\ldots 59\rangle$$

$$out.\langle 63\ldots 23\rangle = data.\langle 63\ldots 23\rangle \wedge data.\langle 45\ldots 5\rangle \wedge data.\langle 40\ldots 0\rangle$$

In the above description, the meanings of the terms are defined as described below.

val.n (where val stands for any identifier such as data, state, etc. . . . and n stands for an integer, e.g. 45) means bit n of value val, where bit 0 is the least significant and earliest bit and bit 1 is the next more significant (more recent) bit, etc.

val.<m . . . n> means the linear bit sequence (val.m, val.(m−1), . . . val.n) considered as an ordered composite multi-bit entity where val.m is the most significant (and most recent) bit and val.n the least significant (and earliest) bit of the sequence.

bseq1^bseq2 means the linear bit sequence resulting from a parallel bit-wise operation where each bit of the linear bit sequence bseq1 is combined with the corresponding bit of linear bit sequence bseq2 using the logical "exclusive-or" function.

Figure 4:
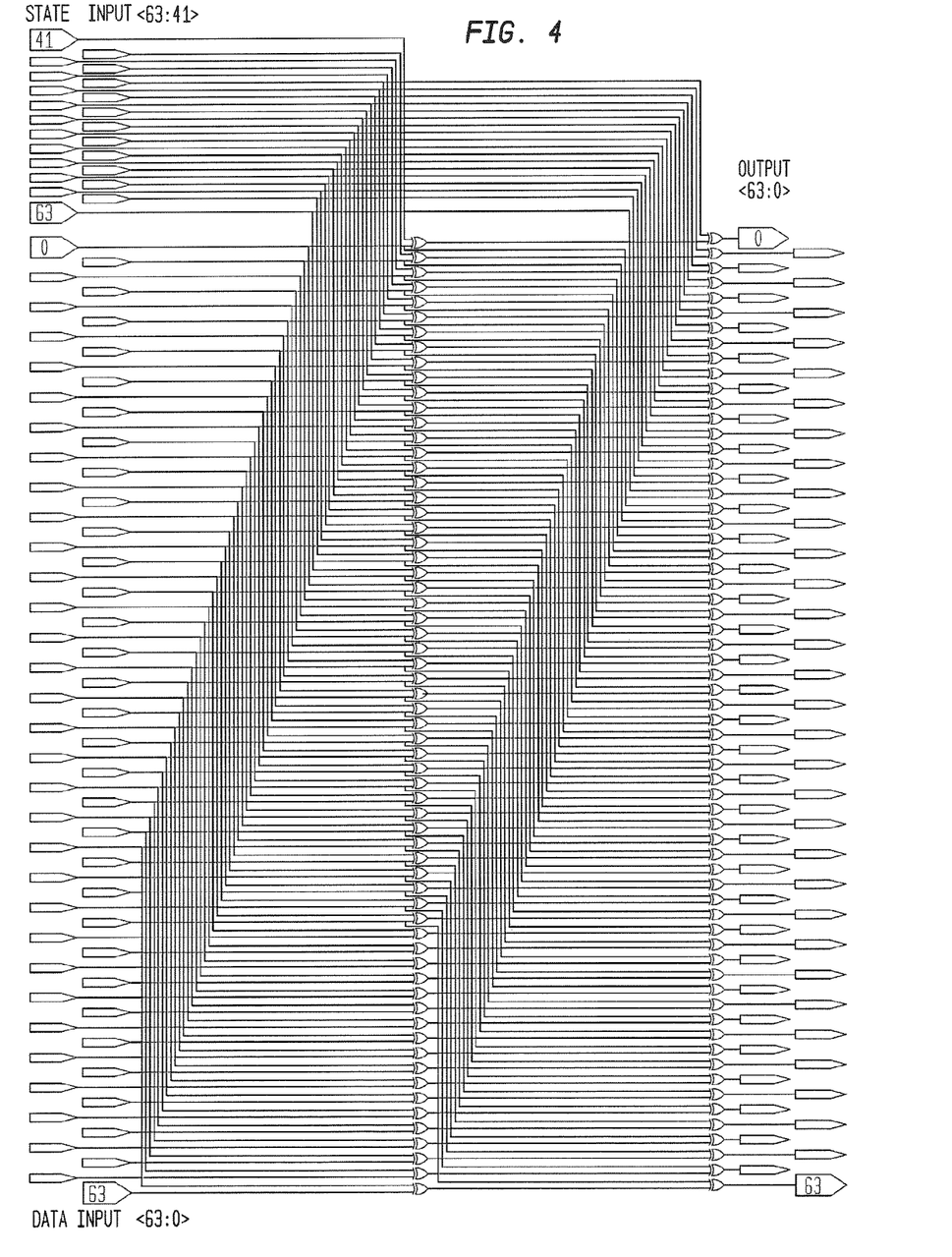
FIG. 4 is a logic diagram of one embodiment of the de-scrambling instruction.

Referring now to FIG. 4, there is shown a logic diagram of one embodiment of the DSLDSC instruction as it may be implemented within an execution unit of a processor. As will be understood by one skilled in the art, the diagram shows only the core functional logic implementing the specific details of the DSLDSC instruction; other non-specific aspects required to implement any processor (such as how the source data bits are directed from their respective registers to the specific logic function for a particular instruction, and how the result value is returned to the required register), are not shown.

In the embodiment in FIG. 4, the gates shown are XOR gates. The first 41 bits of the state input are unused and not shown in FIG. 4. The 23 used bits from the "state" input appear in order at the top left of the diagram; the 64 bits of the "data" input appear in order below them; the 64 bits of the output value "out" are generated in order at the right side of the diagram.

In the wiring format used in FIG. 4, a short gap is left in any horizontal wire which crosses but is not joined to a vertical wire to show that there is no connection between them. Any horizontal wire which crosses a number of vertical wires therefore appears as a dashed line.

One skilled in the art will realize that this is only one of many possible arrangements of the logic for the present invention. The present invention is not limited to this embodiment of the logic, but may apply to any logic arrangement that produces the same result. For example, another alternative arrangement may use 3-input XOR gates rather than pairs of 2-input XOR gates to produce each output bit.

Thus, the present invention advantageously completes the whole de-scrambling operation for 8 bytes in a single cycle. As a result, the present invention advantageously increases the efficiency of de-scrambling data for subsequent modulation and use.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   providing a processor with a single instruction including
      an opcode indicating a de-scrambling instruction,
      an input data value using a first field of the de-scrambling instruction,
      an input state value using a second field of the de-scrambling instruction, wherein a plurality of bits of the input data value from one application of the de-scrambling instruction is the input state value for a next application of the de-scrambling instruction, and
      a reference to a destination register of the processor using a third field of the de-scrambling instruction;
   de-scrambling, using the processor, the input data value using the input state value to create a de-scrambled output value; and
   storing the de-scrambled output value in the destination register.

2. The method of claim 1, wherein the input data value is de-scrambled in accordance with Digital Subscriber Line (DSL) standards.

3. The method of claim 1, wherein the input data value is 64 bits of scrambled source data.

4. The method of claim 1, wherein the de-scrambled output value is a 64-bit output.

5. The method of claim 3, wherein the last 23 bits of the 64-bit input data value from one application of the de-scrambling instruction is the input state value for a next application of the de-scrambling instruction.

6. The method of claim 1, wherein the method is used in a central-office modem end of a Digital Subscriber Line (DSL) link.

7. A method comprising:
   de-scrambling data using a processor, comprising:
   receiving an instruction including
      an opcode indicating a de-scrambling instruction,
      a first field relating to an input data value, and
      a second field relating to an input state value, wherein a plurality of bits of the input data value from one application of the de-scrambling instruction is the input state value for a next application of the de-scrambling instruction, and
   de-scrambling the input data value using the input state value to create a de-scrambled output value.

8. The method of claim 7, wherein the input data value includes 64 bits of scrambled source data and the input state value includes 23 bits of previous de-scrambling state data.

9. The method of claim 8, wherein the last 23 bits of the 64 bits of scrambled source data for one application of the de-scrambling instruction is the previous de-scrambling state data for a next application of the de-scrambling instruction.

10. The method of claim 7, wherein the data is Digital Subscriber Line (DSL) data and the DSL data is de-scrambled according to Asymmetric Digital Subscriber (ADSL) or Very High Bit-Rate DSL (VDSL) standards.

11. The method of claim 7, wherein the processor is a 64-bit long instruction word machine comprising two identical execution units.

12. The method of claim 7, wherein the processor is used in a chip-set implementing a central-office modem end of a Digital Subscriber Line (DSL) link.

13. The method of claim 7, wherein 8 bytes of data are de-scrambled in a single cycle.

14. A processor comprising:
a plurality of registers; and
at least one execution unit configured to de-scramble data by:
receiving an instruction including
an opcode indicating a de-scrambling instruction,
a first field relating to an input data value, and
a second field relating to an input state value, wherein a plurality of bits of the input data value from one application of the de-scrambling instruction is the input state value for a next application of the de-scrambling instruction, and
de-scrambling the input data value using the input state value to create a de-scrambled output value.

15. The processor of claim 14, wherein the input data value includes 64 bits of scrambled source data and the input state value includes 23 bits of previous de-scrambling state data.

16. The processor of claim 15, wherein the last 23 bits of the 64 bits of scrambled source data for one application of the de-scrambling instruction is the previous de-scrambling state data for a next application of the de-scrambling instruction.

17. The processor of claim 14, wherein the data is Digital Subscriber Line (DSL) data and the DSL data is de-scrambled according to Asymmetric Digital Subscriber (ADSL) or Very High Bit-Rate DSL (VDSL) standards.

18. The processor of claim 14, wherein the processor is a 64-bit long instruction word machine comprising two identical execution units.

19. The processor of claim 14, wherein the processor is used in a chip-set implementing a central-office modem end of a Digital Subscriber Line (DSL) link.

20. The processor of claim 14, wherein 8 bytes of data are de-scrambled in a single cycle.

21. An apparatus comprising:
a processor;
a plurality of registers accessible to the processor; and
means for de-scrambling by:
receiving an instruction including
an opcode indicating a de-scrambling instruction,
a first field relating to an input data value, and
a second field relating to an input state value, wherein a plurality of bits of the input data value from one application of the de-scrambling instruction is the input state value for a next application of the de-scrambling instruction, and
de-scrambling the input data value using the input state value to create a de-scrambled output value.

22. The apparatus of claim 21, wherein input data value includes 64 bits of scrambled source data and the input state value includes 23 bits of previous de-scrambling state data.

23. The apparatus of claim 22, wherein the last 23 bits of the 64 bits of scrambled source data for one application of the de-scrambling instruction is the previous de-scrambling state data for a next application of the de-scrambling instruction.

24. The apparatus of claim 21 wherein the data is Digital Subscriber Line (DSL) data and the DSL data is de-scrambled according to Asymmetric Digital Subscriber (ADSL) or Very High Bit-Rate DSL (VDSL) standards.

25. The apparatus of claim 21, wherein the processor is a 64-bit long instruction word machine comprising two identical execution units.

26. The apparatus of claim 21, wherein the processor is used in a chip-set implementing a central-office modem end of a Digital Subscriber Line (DSL) link.

27. The apparatus of claim 21, wherein 8 bytes of data are de-scrambled in a single cycle.

28. A computer readable storage medium having computer program code recorded thereon, that when executed by a processor, causes the processor to de-scramble scrambled data, by:
receiving an instruction including
an opcode indicating a de-scrambling instruction,
a first field relating to an input data value, and
a second field relating to an input state value, wherein a plurality of bits of the input data value from one application of the de-scrambling instruction is the input state value for a next application of the de-scrambling instruction, and
de-scrambling the input data value using the input state value to create a de-scrambled output value.

* * * * *